United States Patent [19]
Wullschleger et al.

[11] Patent Number: 5,270,063
[45] Date of Patent: Dec. 14, 1993

[54] READY-TO-EAT CEREAL PRODUCTS ENRICHED WITH BETA-CAROTENE

[75] Inventors: Richard D. Wullschleger, Battle Creek; Victor L. Fulgoni, East Leroy; James C. Lin, Portage; Susan R. Nielsen, Battle Creek, all of Mich.

[73] Assignee: Kellogg Company, Battle Creek, Mich.

[21] Appl. No.: 924,154

[22] Filed: Aug. 3, 1992

[51] Int. Cl.⁵ .............................................. A23L 1/303
[52] U.S. Cl. ..................................... 426/73; 426/620; 426/311
[58] Field of Search ............... 426/73, 620, 621, 619, 426/618, 311, 575

[56] References Cited

U.S. PATENT DOCUMENTS

| | | | |
|---|---|---|---|
| 2,394,456 | 2/1940 | Korner | 426/311 |
| 2,807,546 | 9/1957 | Anderson | 426/311 |
| 2,980,587 | 4/1961 | Ham | 426/311 |
| 3,293,131 | 12/1966 | Ely | 426/311 |
| 3,558,323 | 1/1971 | Caunnalonga | 426/98 |
| 3,952,112 | 4/1976 | Fulger et al. | 426/321 |
| 4,230,687 | 10/1980 | Sair | 426/311 |
| 4,565,702 | 1/1986 | Morley et al. | 426/93 |
| 4,670,247 | 6/1987 | Scialpi | 424/484 |
| 4,764,388 | 8/1988 | Sullivan | 426/311 |

FOREIGN PATENT DOCUMENTS

| | | | |
|---|---|---|---|
| 708130 | 4/1965 | Canada | 426/73 |
| 0125894 | 11/1984 | European Pat. Off. | 426/311 |
| 59-137410 | 8/1984 | Japan | 426/311 |

*Primary Examiner*—Carolyn Paden
*Attorney, Agent, or Firm*—Felfe & Lynch

[57] ABSTRACT

This invention provides for a cereal composition, particularly in a ready-to-eat cereal, that contains beta-carotene (BC) in an amount ranging from about 0.001% to about 0.02% based on the dry weight of the cereal composition. The beta-carotene may be incorporated in the form of water insoluble beadlets or may be added in a soluble form with a sweetening agent during manufacture of the composition. The cereal composition containing BC retains good stability, and normal color, flavor and aroma characteristics as compared with analogous cereal compositions without beta-carotene.

10 Claims, 2 Drawing Sheets

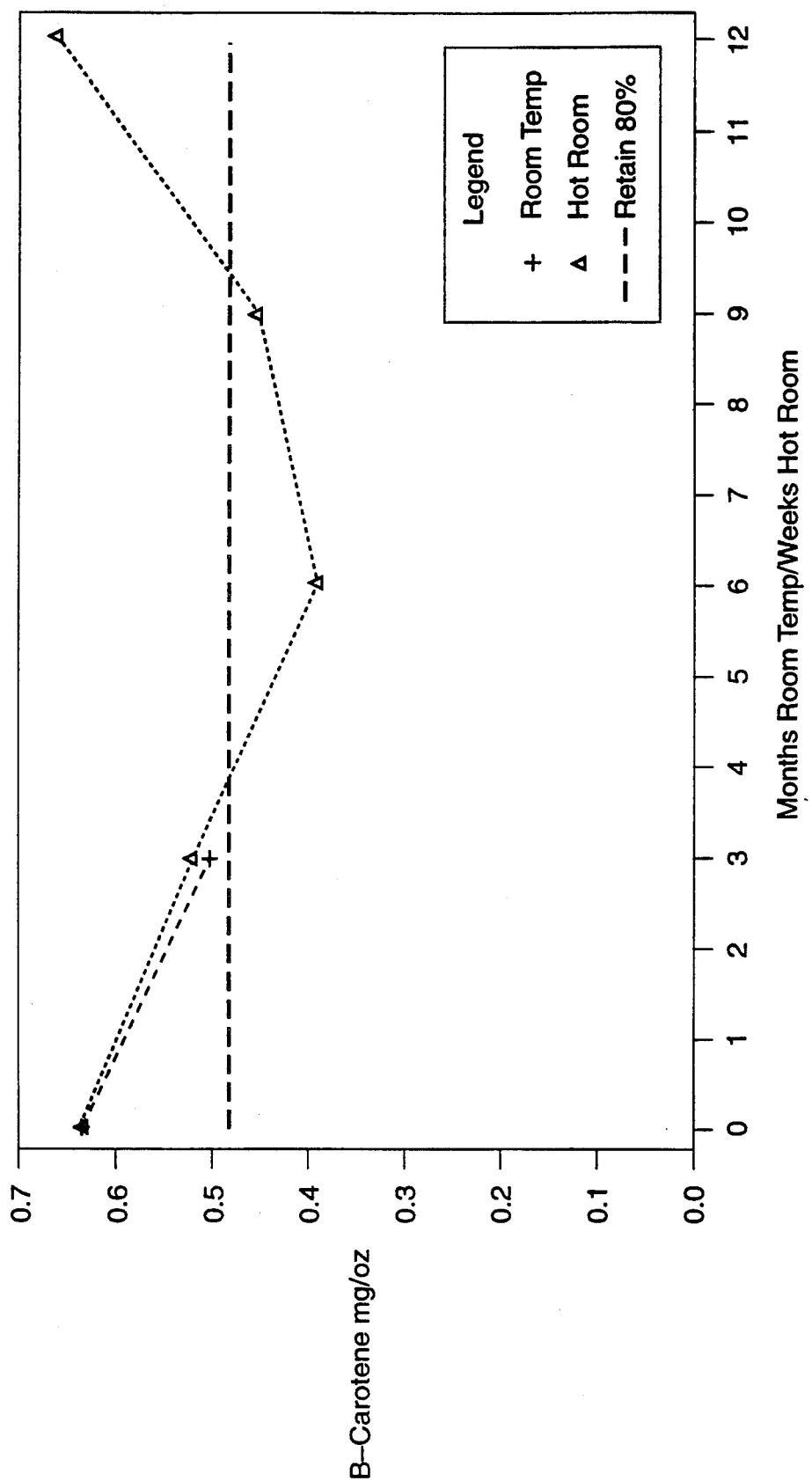

READY-TO-EAT CEREAL PRODUCTS ENRICHED WITH BETA-CAROTENE

FIELD OF THE INVENTION

This invention relates to ready-to-eat cereal products enriched with beta-carotene (BC). More particularly, it relates to cereal products in which the beta-carotene is present in a stabilized form which does not change the color, flavor or appearance of the product and in which the beta-carotene does not degrade under normal storage conditions.

BACKGROUND OF THE INVENTION

Beta-carotene has, for many years, been used in food products in order to add color. For example, in U.S. Pat. No. 4,565,702, which is concerned with dietary fiber compositions comprising insoluble fiber and soluble fiber formed into flavored food products, small amounts of beta-carotene are used to provide an orange color in orange-flavored tablets, fruit rolls and snack bars. Although beta-carotene is known to be an excellent source of vitamin A, it has heretofore not been feasible to incorporate beta-carotene into cereal-based products such as ready-to-eat cereals because the addition of sufficient beta-carotene to provide an effective amount of vitamin A also causes undesirable changes in the color, flavor and appearance of the product. Furthermore, since beta-carotene is a natural anti-oxidant, it will degrade quickly, by oxidation, under normal storage conditions.

It is therefore a principal object of this invention to provide cereal products enriched with beta-carotene in which the beta-carotene is present in sufficient amount to provide a source of vitamin A. It is a further object of the invention to provide such an enriched cereal in which the beta-carotene is in stable form and does not adversely alter the color, flavor or aroma of the product.

SUMMARY OF THE INVENTION

This invention provides cereal compositions, particularly ready-to-eat cereals, containing beta-carotene in an amount ranging from about 0.001% to about 0.02%, percentage based on the dry weight of the cereal composition. The beta-carotene incorporated into the composition may be encapsulated within variably sized water insoluble beadlets or may be added in a soluble form with a sweetening agent during the production of the composition. If the beta-carotene is encapsulated, the encapsulating material is preferably gelatin or alginate, having a particle size ranging from about 50 microns to about 500 microns. The beta-carotene incorporated into these compositions by these procedures remains stable under normal storage conditions, and does not produce a product with color, flavor or aroma characteristics which are significantly different over analogous cereal compositions not containing beta-carotene.

BRIEF DESCRIPTION OF THE DRAWINGS

FIG. 2 is a graph showing study of stability and content of BC enriched cereal composition after treatment in hot room and room temperature over 12 week/12 month period.

DETAILED DISCLOSURE

Figure 1:
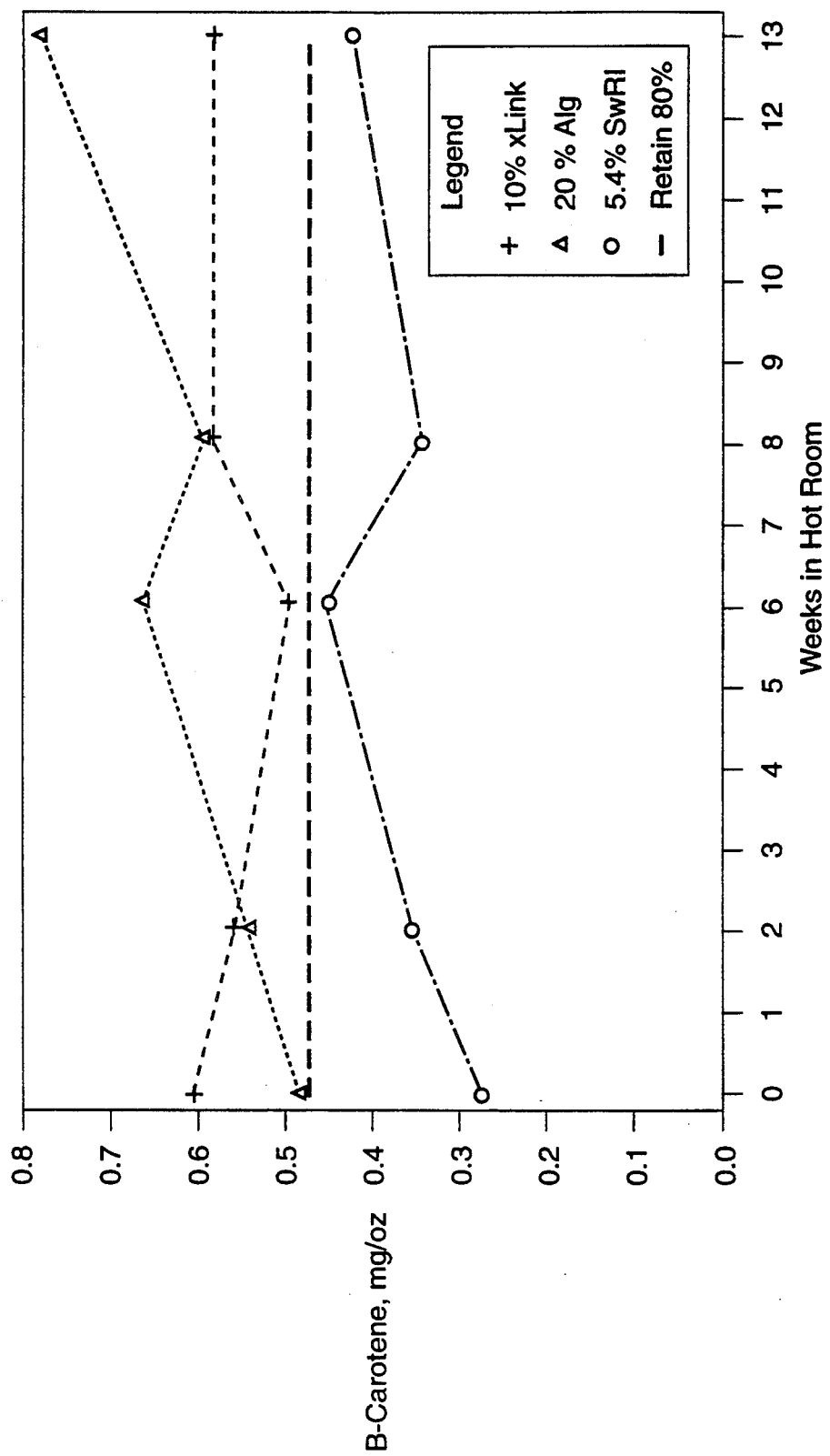
FIG. 1 is a graph showing study of stability and content of BC in a cereal composition over time with crosslinked BC at 0.6 mg/oz., alginate coated BC at 0.6 mg/oz., and crosslinked SWI gelatin BC at 0.6 mg/oz after treatment in hot room over 12 week period.

Beta-carotene(BC) is a precursor of vitamin A and ingested beta-carotene is converted in the human body to vitamin A. Conversion of BC to Vitamin A proceeds on an "as needed" basis. The amount of beta-carotene ingested need not be closely controlled for fear of vitamin A toxicity.

Efforts to incorporate beta-carotene into food products have been largely unsuccessful because beta-carotene causes the food to change color, flavor and aroma. Indeed, small amounts of beta-carotene—too small to be an effective source of vitamin A—are commonly incorporated into food products such as soft drinks, margarine, cheese, etc. as a coloring agent. A further problem with beta-carotene is that it is a natural anti-oxidant which degrades quickly under normal ambient storage conditions.

We have discovered that, by incorporating beta-carotene into cereal products, in particular ready-to-eat cereals, in the form of water insoluble beadlets and/or in a finely divided particulate form, cereal products can be prepared which contain sufficient amount of beta-carotene to provide an effective source of the Recommended Daily Allowance (RDA) of vitamin A and which, at the same time, do not exhibit significant changes in color, aroma or flavor. Furthermore, with the beta-carotene being in the form of insoluble beadlets, oxidation is significantly reduced or even entirely eliminated, thus providing for a stable product under ordinary conditions of food storage.

The beadlets usable in the composition and process of this invention consist essentially of beta-carotene encapsulated in a capsule material which are water insoluble at temperatures below about 293° F. Suitable encapsulating materials include, for example, gelatin, alginates such as sodium alginate and the like, particularly gelatin. The beadlets can be prepared by any suitable method, so long as discrete encapsulated particles of suitable particle size are obtained. A particularly suitable method of preparing beadlets for use in this invention is disclosed in U.S. Pat. No. 4,670,247, pertinent portions of which are incorporated herein by reference.

Beta-carotene beadlets are particularly suited for incorporation into cereal products, such as ready-to-eat dry cereals. In ready-to-eat dry cereals, the beadlets should be incorporated so that the resultant product has a beta-carotene content ranging from about 0.001% to 0.02%, preferably from about 0.001% to about 0.01%, based on the dry weight of the ready-to-eat cereal. This is equivalent to a beta-carotene content of about 0.3 mg to about 3.0 mg per 28.35 gram (1 oz.) serving.

In order to be successfully incorporated into dry ready-to-eat cereal products and to be stable under expected storage conditions, the beta-carotene beadlets should be of a particle size ranging from about 50 microns to about 500 microns. There is an effective lower limit to particle size because, as particle size is reduced, particle surface area is increased and a larger surface area may adversely affect stability.

In general, the beta-carotene beadlets can be added to the bulk cereal starting materials during the cooking process or when the process is complete, and then the cooked cereal product is processed into the finished beta-carotene enriched cereal product of the present invention. A wide variety of bulk cereal ingredients can be combined with the beta-carotene beadlets in accordance with the present invention. The cereal ingredients include: whole grains such as whole wheat, rice, oats, barley, corn and rye; grain components such as wheat germ and brans including oat bran, wheat bran, etc.; flour such as wheat flour, corn flour, etc.; legumes such soybeans, peas, beans and the like; and non-bran fiber sources such as prune fiber, guar, beet fiber and citrus pulp and other raw material ingredients which can conventionally be included in dry ready-to-eat cereals.

This invention will be better understood by reference to the following examples, which are here included for purposes of exemplification and are not to be construed as limitations.

EXAMPLE 1

Incorporation of Beta-Carotene into cereal composition.

To test the stability of the cereal composition ready-to-eat cereal enriched with beta-carotene, the following compositions were prepared:

| Ingredient | % Dry Basis |
| --- | --- |
| Wheat bran | 81.230 |
| sugar | 8.20 |
| HFCS, 42% | 5.40 |
| malt flavor (wort) | 2.90 |
| salt | 2.10 |
| 10% Beta-Carotene, (crosslinked gelatin) | 0.022 |
| Vitamin and Minerals | 0.0564 |

Cooker is preheated to 254° F. for 30 minutes at 17 psi. Bran and flavoring, including vitamins, minerals, water and BC are mixed in cooker. Then the mixture is cooked at 17 psi, for 30 minutes at 254° F. Afterwards the cooked cereal mixture is dried to 25% moisture. The cooked cereal mixture is sized in a Fitz mill, and then shredded in a Bran shred mill. After shredding, the remaining mixture is dried on vat for 20 minutes at 250° F. Vitamin A, D, E, and C are sprayed on after drying.

A stability study was carried out on the samples over a 12 week period in the hot room and over a 12 month period at room temperature. See Table 1. Results indicate that cereal composition with beta-carotene beadlets provide excellent stability. The color, appearance, flavor and BC are all stable and acceptable for R-T-E cereal of this invention.

TABLE 1

| | mg/oz BC |
| --- | --- |
| Hot Room | |
| Initial | 0.67 |
| 3 Weeks | 0.81 |
| 6 Weeks | 0.64 |
| 9 Weeks | 0.61 |
| 12 Weeks | 0.63 |
| Room Temp | |
| Initial | 0.67 |
| 3 Months | 0.51 |
| 6 Months | 0.38 |
| 9 Months | 0.49 |
| 12 Months | 0.62 |

*Pilot Plant Food Stable for all Attributes

EXAMPLE 2

Incorporation of Beta-Carotene into Cereal Composition

The following compositions were prepared; (Cooked BRAN)

| Ingredients | % Dry Basis |
| --- | --- |
| Wheat bran | 76.695 |
| sugar | 17.400 |
| malt flavor (wort) | 2.900 |
| salt | 2.540 |
| Vitamin & Mineral | 0.056 |

Cooker is preheated to 254° F. for 30 minutes at 17 psi. Bran and flavoring, including vitamins, minerals, and water are mixed in cooker. The mixture is continuously mixed for 5 minutes at high gear. Then the mixture is cooked at 17 psi, for 30 minutes at 254° F. Afterwards the mixture is dried to 12% moisture. The remaining mixture is ground in a Fitz mill utilizing a #4 screen.

To prepare the cereal composition, the following compositions were prepared:

| | Ingredient | % Dry Basis |
| --- | --- | --- |
| B | Cooked Bran | 29.700 |
| A | Sugar | 20.700 |
| B | Rolled Oats, Quick Cooking | 19.800 |
| A | Kaomel Vegetable Oil | 10.300 |
| B | Oat Bran (National) | 7.250 |
| A | Malt syrup | 3.400 |
| A | Corn syrup | 2.700 |
| A | Coconut, Desiccated, Medium Cut | 2.630 |
| B | Wheat Starch, pre-gelatinized | 2.060 |
| A | brown sugar molasses | 1.300 |
| A | Vitamin premix with salt | 0.450 |
| B | Sodium Bicarbonate & Minerals | 0.446 |
| A | Vitamins A & D NAO | 0.023 |

First heat slurry by mixing all ingredients labeled A for 15 minutes to 145° F. Separately mix dry (labeled B) ingredients for one minute in Hobart. Mix slurry and mixture for two minutes at medium speed. Extract the remaining mixture through the COB die. See U.S. Pat. No. 4,178,392, the content of which is incorporated herein by reference. Then bake in oven.

Samples containing the above mixture were combined with the following beta-carotene products:
+ 4.90 g.
  10% Beta-Carotene, crosslinked gelatin (Roche)
  % Dry Basis=0.022
▲ 2.45 g.
  b 20% Beta-Carotene, alginate coated (Roche)
  % Dry Basis=0.011
○ 9.02 g.
  5.43% Beta-Carotene, crosslinked gelatin (SWI)
  % Dry Basis=0.040

The samples were stored in a hot room and were tested for 13 weeks to determine the stability and the content of beta-carotene retained in the cereal. Twenty-nine trained difference panelists from Science and Technology were given the control and a test product made with crosslinked gelatin beadlets to determine whether the products were detectably different.

No significant difference was detected between the standard cereal composition and the test product with beta-carotene. FIG. 1 shows the level of beta-carotene retained in the test samples during the 13 week hot-room stability testing. The color, appearance, and flavor were acceptable for R-T-E cereal of this invention.

EXAMPLE 3

Incorporation of Beta-Carotene into Cereal Composition

The following compositions were prepared;

| Ingredients | % Dry Basis |
|---|---|
| A rolled Oats, quick cooking | 49.100 |
| B Brown sugar, light | 25.300 |
| B Kaomel Vegetable Oil | 11.700 |
| A Dry Whey, Extra Grade | 6.500 |
| B Rice Krispies | 4.500 |
| B 42% HFCS | 2.100 |
| A Salt | 0.430 |
| B Vitamins A & D with BHT (3%) | 0.142 |
| A Ground Cinnamon | 0.105 |
| A Niacin B3 | 0.004 |
| A Sodium Acetate | 0.002 |
| A PyrClde Vit B6 | 0.001 |
| A Riboflavin B2 | 0.001 |
| A Folic Acid | 0.0002 |
| A 10% Beta-Carotene, cross-linked gelatin scaled up version | 0.212 |

Mix dry (labeled A) ingredients in Hobart. Separately mix slurry, all ingredients (labeled B), and heat to 150° F. Add slurry and mixture for two minutes at medium speed. Toast in oven for ten minutes at 280° F., remove and stir after five minutes. Size through ½" open screen and dry on vat at 200° F., then allow to cool.

Stability of the cereal composition was tested after storage at room temperature at 3, 6, 9, and 12 month intervals and after storage in the hot room (100° F.) at 3, 6, 9, 12 week intervals. Thirty panelists tested the cereal composition with and without beta-carotene. The results are shown in FIG. 2 and Table 2. The color, appearance, and flavor were acceptable and appropriate for R-T-E cereal of this invention.

TABLE 2

| | mg/oz BC |
|---|---|
| Hot Room | |
| Initial | 0.64 |
| 3 Weeks | 0.52 |
| 6 Weeks | 0.39 |
| 9 Weeks | 0.45 |
| 12 Weeks | 0.66 |
| Room Temp | |
| Initial | 0.64 |
| 3 Months | 0.50 |
| 6 Months | 0.77 |
| 9 Months | 0.32 |
| 12 Months | 0.44 |

*Difference Testing has been Completed

EXAMPLE 4

Incorporation of Beta-Carotene into cereal composition

The following compositions were prepared;

| Ingredients | % Dry Basis |
|---|---|
| Puffed wheat, Durum | 40.000 |
| Sucrose | 46.446 |
| Corn Syrup, 62 DE | 10.230 |
| Honey | 1.670 |
| Salt | 0.350 |
| Caramel color, WJ 00490 | 0.070 |
| Sodium acetate | 0.102 |
| sodium L-ascorbate (vit C) | 0.061 |
| 10% Beta-Carotene* | 0.012 |
| Ferric Phosphate | 0.023 |
| Niacin B3 | 0.018 |
| Pyridoxine Hydrochloride B6 | 0.002 |
| Riboflavin | 0.002 |
| Folic Acid | 0.0003 |
| Kaomel Vegetable Oil | 1.000 |
| Vit A & D oil, NAO | 0.023 |
| Thiamin B1 | 0.001 |

*BC beadlets used in this example were water soluble. It is believed that the sweetening agents in the composition coats the BC beadlets without the need for cross-linking.

Heat coating equipment and dryer. Heat wheat on vat to 210° F. Heat syrup on hotplate to 260° F. Spray syrup on base using 0.046" nozzle. Pour oil solution with Vitamin A&D and B1 on coated base and remove from drum. Dry for ten minutes at 210° F. and mix after five minutes. Cool and pass through ½" screen.

The products were tested to determine the effect on the stability of the cereal composition by adding 10% beta-carotene to the standard low temperature coating.

There were no major stability issues reported by panelists or by chemical analyses at the end of 12 months.

TABLE 3

| Room Temp | mg/oz BC |
|---|---|
| Initial | 0.65 |
| Initial | 0.65 |
| 3 Months | 0.40 |
| 4 Months | 0.52 |
| 6 Months | 0.47 |
| 9 Months | 0.48 |
| 12 Months | 0.50 |

*No Major Stability Issues Reported by Panelists or by Chemistry Analysis

The beta-carotene level measured at 12 months was 0.50 mg/oz. Panelists found no differences between the control product without beta-carotene and the test product with BC. The appearance and flavor were acceptable and appropriate for R-T-E cereal of this invention. Although the color appeared slightly different from other products, the product was considered acceptable.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. Ready-to-eat cereal comprising at least one cereal ingredient and beta-carotene encapsulated water insoluble beadlet in an amount sufficient to provide at least a portion of the Recommended Daily Allowance of Vitamin A.

2. The ready-to-eat cereal of claim 1 wherein the beta-carotene is present in the cereal product in an amount ranging from about 0.001% to about 0.02%.

3. The ready-to-eat cereal of claim 1, wherein said beta-carotene encapsulated water insoluble beadlets range in size from about 50 microns to about 500 microns.

4. The ready-to-eat cereal of claim 1 wherein beta-carotene is present in the cereal product in an amount ranging from about 0.001% to about 0.01%.

5. The ready-to-eat cereal of claim 1 wherein beat-carotene is encapsulated in crosslinked gelatin and the beadlets have a particle size ranging from about 100 microns to about 400 microns.

6. The ready-to-eat cereal of claim 1 wherein the beadlets are encapsulated in an alginate and the beadlets have a particle size ranging from about 50 microns to about 200 microns.

7. Method for incorporating beta-carotene into a ready-to-eat cereal which comprises admixing beta-carotene encapsulated water insoluble beadlets with one or more cereal ingredients.

8. The method of claim 7, wherein said beta-carotene encapsulated water insoluble beadlets added to the ready-to-eat cereal have a particle size ranging from about 50 microns to about 500 microns.

9. The method of claim 7 wherein the beta-carotene containing beadlets have a particle size ranging from about 50 microns to about 400 microns.

10. In a ready-to-eat cereal containing Vitamin A, the improvement which comprises incorporating vitamin A in the form of beta-carotene encapsulated water insoluble beadlets.

* * * * *